United States Patent
Ishii et al.

(10) Patent No.: US 9,042,675 B2
(45) Date of Patent: May 26, 2015

(54) IMAGE PROCESSING APPARATUS, IMAGE PROCESSING METHOD, AND COMPUTER-READABLE RECORDING MEDIUM WHICH CORRECTS AN IMAGE SUCH THAT SOME OF WARPING OF THE IMAGE IS LEFT

(75) Inventors: Masaki Ishii, Kanagawa (JP); Akira Kinoshita, Kanagawa (JP); Takahiro Imai, Tokyo (JP); Kenji Namie, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 228 days.

(21) Appl. No.: 13/813,447

(22) PCT Filed: Jul. 13, 2011

(86) PCT No.: PCT/JP2011/066507
§ 371 (c)(1),
(2), (4) Date: Jan. 31, 2013

(87) PCT Pub. No.: WO2012/017825
PCT Pub. Date: Feb. 9, 2012

(65) Prior Publication Data
US 2013/0129251 A1    May 23, 2013

(30) Foreign Application Priority Data

| Aug. 3, 2010 | (JP) | 2010-174702 |
| Jun. 8, 2011 | (JP) | 2011-128398 |

(51) Int. Cl.
*G06K 9/40* (2006.01)
*H04N 7/18* (2006.01)
*G06T 5/00* (2006.01)
(Continued)

(52) U.S. Cl.
CPC ............ *G06T 5/006* (2013.01); *H04N 5/2628* (2013.01); *G06T 3/0062* (2013.01)

(58) Field of Classification Search
None
See application file for complete search history.

(56) References Cited

U.S. PATENT DOCUMENTS 6,801,334 B1 * 10/2004 Enomoto .................. 358/1.18
6,954,284 B2 * 10/2005 Enomoto .................. 358/1.18
(Continued)

FOREIGN PATENT DOCUMENTS

| JP | 2000-004352 | 1/2000 |
| JP | 2001-238177 | 8/2001 |

(Continued)

OTHER PUBLICATIONS

International Search Report Issued Aug. 23, 2011 in PCT/JP2011/066507 Filed on Jul. 13, 2011.

*Primary Examiner* — Wenpeng Chen
(74) *Attorney, Agent, or Firm* — Oblon, McClelland, Maier & Neustadt, L.L.P.

(57) ABSTRACT

An image processing apparatus includes an image acquiring unit that acquires an image; an information acquiring unit that acquires image information indicative of a content of the image; and a correcting unit that corrects the image based on the image information such that some of warping of the image is left. The horizontal direction component of the warping may be completely or nearly completely eliminated while a predetermined portion of a vertical direction component of the warping is left, when the image information indicates the content of the image is a person. Alternatively, there is an analyzer which generates the image information indicating that the content of the image is a erson when the analyzing determines that the image contains two or more persons.

11 Claims, 15 Drawing Sheets

(51) Int. Cl.
*H04N 5/262* (2006.01)
*G06T 3/00* (2006.01)

(56) References Cited

U.S. PATENT DOCUMENTS

| | | | |
|---|---|---|---|
| 7,145,597 | B1 | 12/2006 | Kinjo |
| 8,699,760 | B2 * | 4/2014 | Kusama et al. ............. 382/118 |
| 2003/0189730 | A1 * | 10/2003 | Enomoto ................... 358/3.26 |
| 2005/0105822 | A1 * | 5/2005 | Narita ....................... 382/275 |
| 2007/0263902 | A1 * | 11/2007 | Higuchi et al. ............. 382/104 |
| 2009/0190855 | A1 | 7/2009 | Kasahara |
| 2010/0067749 | A1 * | 3/2010 | Kusama et al. ............. 382/118 |
| 2010/0165104 | A1 * | 7/2010 | Fujita et al. ................. 348/148 |
| 2012/0265416 | A1 * | 10/2012 | Lu et al. ..................... 701/70 |

FOREIGN PATENT DOCUMENTS

| | | |
|---|---|---|
| JP | 2003-037769 | 2/2003 |
| JP | 2007-264831 | 10/2007 |
| JP | 2008-052589 | 3/2008 |
| JP | 2008-191921 | 8/2008 |
| JP | 2009-055415 | 3/2009 |
| JP | 2009-177703 | 8/2009 |

* cited by examiner

| IMAGE INFORMATION | α | β |
|---|---|---|
| PERSON | 1 | 0.3 |
| LETTER | 1 | 1 |
| : | : | : | ature
IMAGE PROCESSING APPARATUS, IMAGE PROCESSING METHOD, AND COMPUTER-READABLE RECORDING MEDIUM WHICH CORRECTS AN IMAGE SUCH THAT SOME OF WARPING OF THE IMAGE IS LEFT

TECHNICAL FIELD

The present invention relates to an image processing apparatus, an image processing method, and a computer-readable recording medium.

BACKGROUND ART

A technology enables the imaging of a wide area of a subject within an image by using a wide angle lens having a large angle of view. The technology has been increasingly used in recent years for teleconferences and vehicle-mounted cameras. However, an image obtained with a wide angle lens tends to produce problems such as enhancement of perspective and warping due to distortion (geometric warping) that makes the subject, such as a person, appear warped in the image. For example, when a wide angle lens is used in a teleconference setting, the face of a person in the image may appear warped (problem of distortion) or the person may appear to be sitting farther than where he or she actually is (problem of enhancement of perspective). To address these problems, various correcting technologies have been proposed, including distortion correction and perspective correction (see Japanese Laid-open Patent Publication No. 2001-238177 ("Patent Document 1") and Japanese Laid-open Patent Publication No. 2009-177703 ("Patent Document 2"), for example).

Patent Document 1 discusses an image processing apparatus capable of performing a predetermined image process, such as gradation control, geometric warping correction, or smoothing depending on an estimated photographed scene, so that high-quality images can be efficiently obtained.

Patent Document 2 discusses an image processing apparatus that corrects a fisheye image having a large distortion into an easy-to-see image by performing coordinates conversion only in the horizontal direction in order to reduce the cost of a photography apparatus.

While the image processing apparatus according to Patent Document 1 is capable of correcting distortion, it cannot eliminate the problem of enhancement of perspective. Further, the image processing apparatus according to Patent Document 2, which corrects for distortion only in the horizontal direction, may not be able to sufficiently correct distortion depending on the photographed scene.

SUMMARY OF THE INVENTION

In view of the foregoing, it is an object of the present invention to provide an image processing apparatus and an image processing method for generating an image in which distortion and perspective are balanced, and a computer-readable recording medium storing a program configured to cause a computer to perform the steps of the image processing method.

In one aspect of the invention, an image processing apparatus includes an image acquiring unit configured to acquire an image; an information acquiring unit configured to acquire image information indicative of a content of the image; and a correcting unit configured to correct the image based on the image information such that some of warping of the image is left.

In another aspect, an image processing method includes acquiring an image; acquiring image information indicative of a content of the image; and correcting the image based on the image information such that some of warping of the image is left.

In another aspect, a computer-readable recording medium stores a program causing a computer to perform the steps of the image processing method.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

BEST MODE OF CARRYING OUT THE INVENTION

Figure 1:
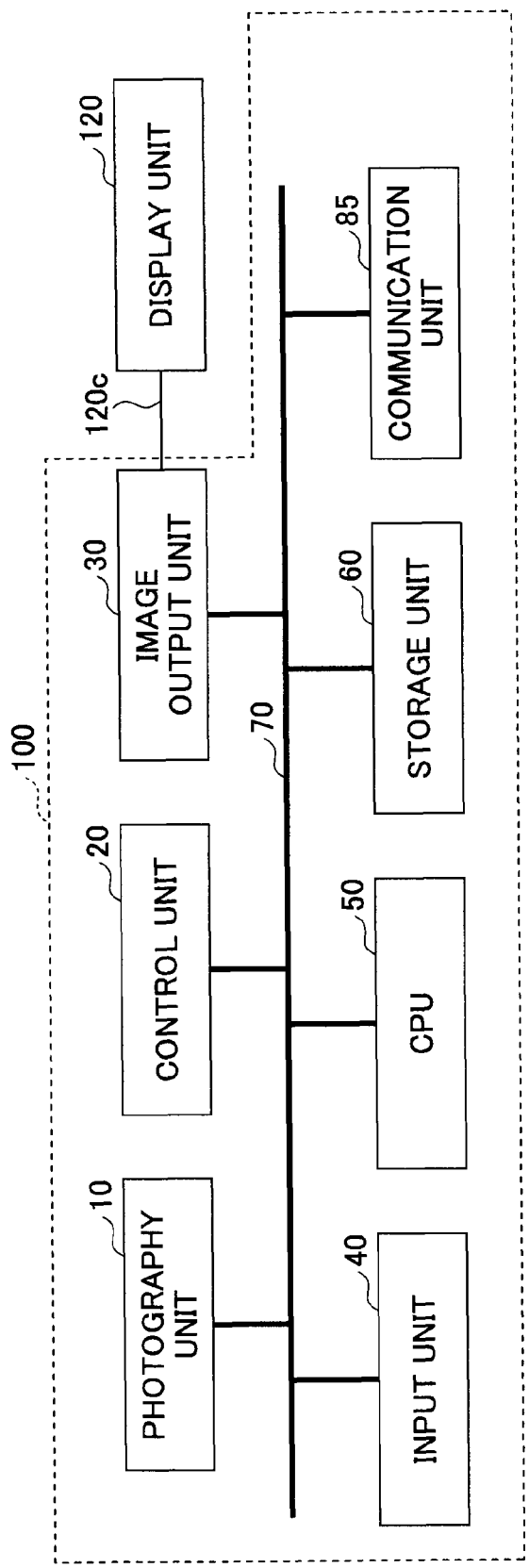
FIG. 1 is a functional block diagram of an image processing apparatus according to an embodiment of the present invention.

In the following, embodiments of the present invention are described with reference to the attached drawings, in which constituent elements having similar functions or steps for performing similar processes are designated with similar reference numerals to avoid redundant description.

Embodiment 1

Figure 13:
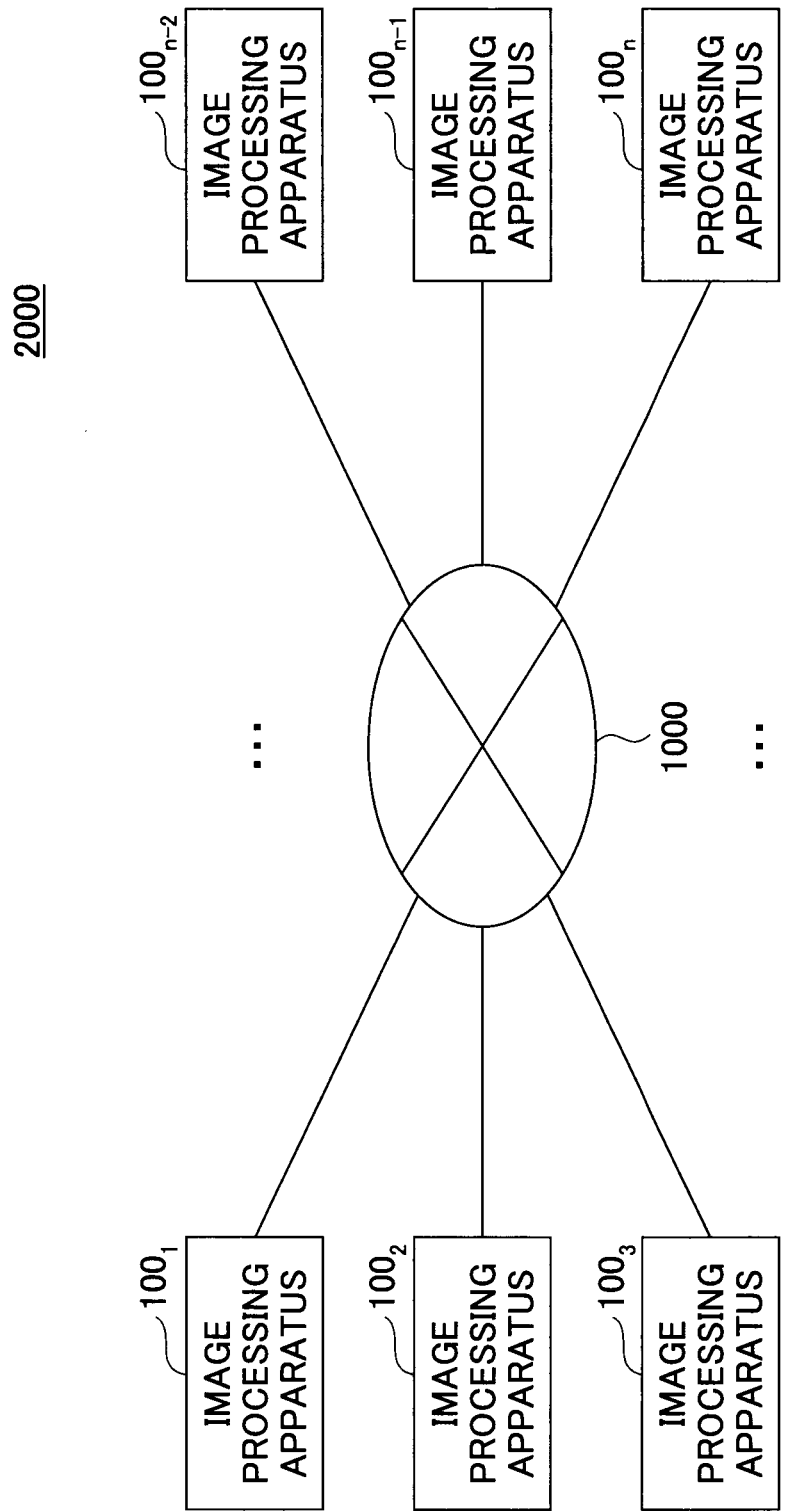
FIG. 13 is a functional block diagram of a communication system according to an embodiment.

FIG. 13 is a functional block diagram of a communication system 2000 including image processing apparatuses according to Embodiment 1. In the illustrated example of FIG. 13, N (N is an integer of two or more) image processing apparatuses $100_n$ (n=1, ..., N) are connected to a network 1000. In the following description, of the N image processing apparatuses $100_n$ (n=1, ..., N), the image processing apparatus $100_1$ is described as being the image processing apparatus of interest. However, any one of the image processing apparatuses $100_2$ through $100_N$ may be considered an image processing apparatus of interest. The image processing apparatuses $100_n$ may be generally referred to as "the image processing apparatus 100".

In the communication system 2000, of the N image processing apparatuses $100_n$ (n=1, ..., N), an image and the like may be transmitted and received between plural image processing apparatuses and other plural image processing apparatuses via the network 1000. Specifically, the image processing apparatus 100 may correct an image input to the image processing apparatus 100 and then transmit the corrected image to the other plural image processing apparatuses 100. In the communication system 2000, the image processing apparatus 100 may transmit the image to the other plural image processing apparatuses 100 one-directionally.

The communication system 2000 is described in the following as being used for a video teleconference. However, the communication system 2000 may be used for other purposes. When used for a video teleconference, the image processing apparatuses $100_n$ (n=1, ..., N) may be installed at separate and distant conference locations. One or more participants may be present at each of the conference locations. The one or more participants may orally discuss or present a topic, or write letters or symbols on a white board or a sheet of paper, for example, during the video teleconference.

FIG. 1 is a functional block diagram of the image processing apparatus 100 according to Embodiment 1. The image processing apparatus 100 includes the photography unit 10, a control unit 20, a image output unit 30, an input unit 40, a CPU 50, a storage unit 60, and a communication unit 85, which are all connected via a bus 70.

The photography unit 10 may include a camera unit having a wide angle lens or an imaging element. The photography unit 10 may take various images. The control unit 20 controls the image processing apparatus 100 as a whole. The image output unit 30 outputs a corrected image to a display apparatus 120, which displays the corrected image. The display apparatus 120 may display a subject image or operating icons and may include a liquid crystal display or an organic EL (electroluminescent) display. The display apparatus 120 may be connected to the image output unit 30 via a cable 120c.

The communication unit 85 may transmit the corrected image to the other image processing apparatuses connected to the network 1000. The communication unit 85 may include a network I/F unit. The communication unit 85 thus provides an interface with the other image processing apparatuses connected to the network, which may include a wired or wireless data transmission channel, such as a LAN (Local Area Network) or a WAN (Wide Area Network).

The input unit 40 provides a user interface and may include a LCD (Liquid Crystal Display) having various key switches (hardware keys) or a touch panel function with GUI (Graphical User Interface) software keys. A user may enter various information via the input unit 40.

The storage unit 60 may temporarily store an image or various information. The storage unit 60 may include a ROM (Read Only Memory), a RAM (Random Access Memory), or a HDD (Hard Disk Drive). The storage unit 60 may store or temporarily save an OS (operating system) executed by the control unit 20, a program such as an application software program, or other data. The storage unit 60 may also store data related to the application software program. The details of the input unit 40 and the storage unit 60 will be described later.

Figure 14:
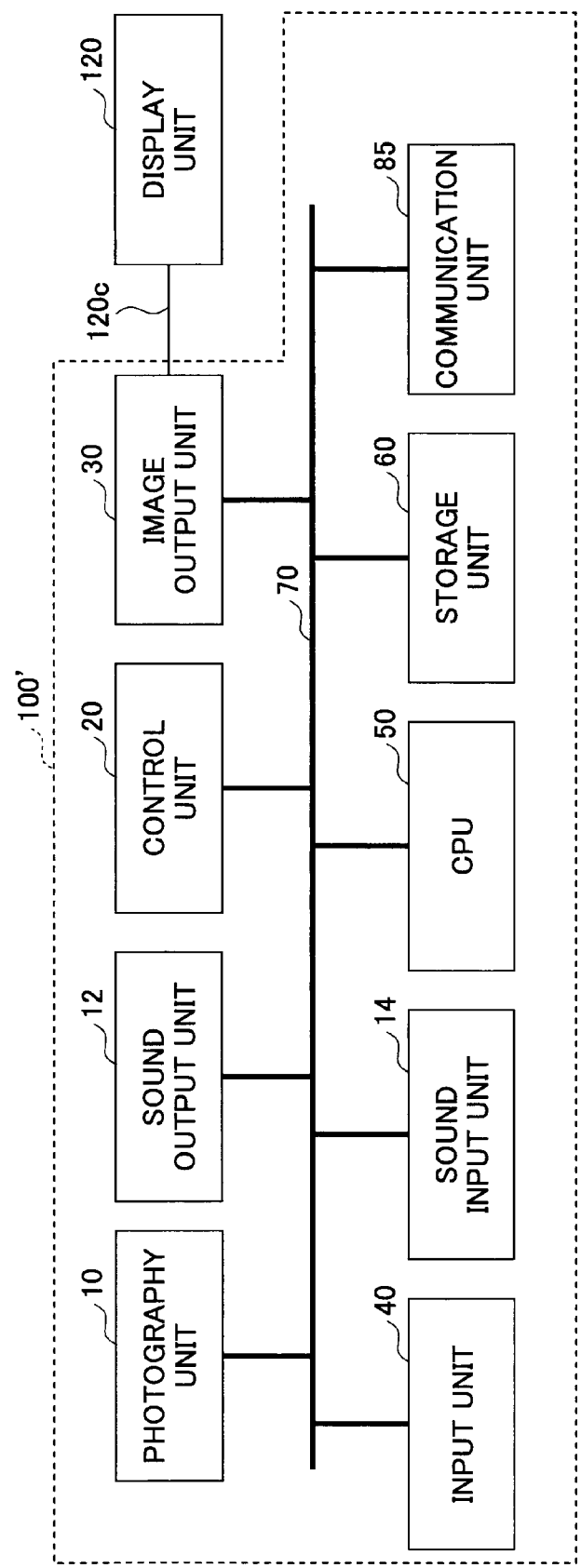
FIG. 14 is a functional block diagram of an image processing apparatus according to a variation of the first embodiment.

FIG. 14 is a functional block diagram of an image processing apparatus 100' according to a variation of the embodiment of FIG. 1. The variation of FIG. 14 differs from the embodiment of FIG. 1 in that a sound output unit 12 and a sound input unit 14 are added. The sound output unit 12 may produce an audio output from an audio signal received from another image processing apparatus 100 via the network 1000. The sound output unit 12 may include a speaker.

The sound input unit 14 collects the sound of voice or other audible sound produced by one or more persons (such as teleconference participants) present at the location of the image processing apparatus 100. The sound input unit 14 may include a microphone. When the communication system 2000 is used for applications that do not involve audio, the image processing apparatus 100 illustrated in FIG. 1 may be used. When the communication system 2000 is used for applications such as a video teleconference, the image processing apparatus 100' illustrated in FIG. 14 may be used.

Figure 15:
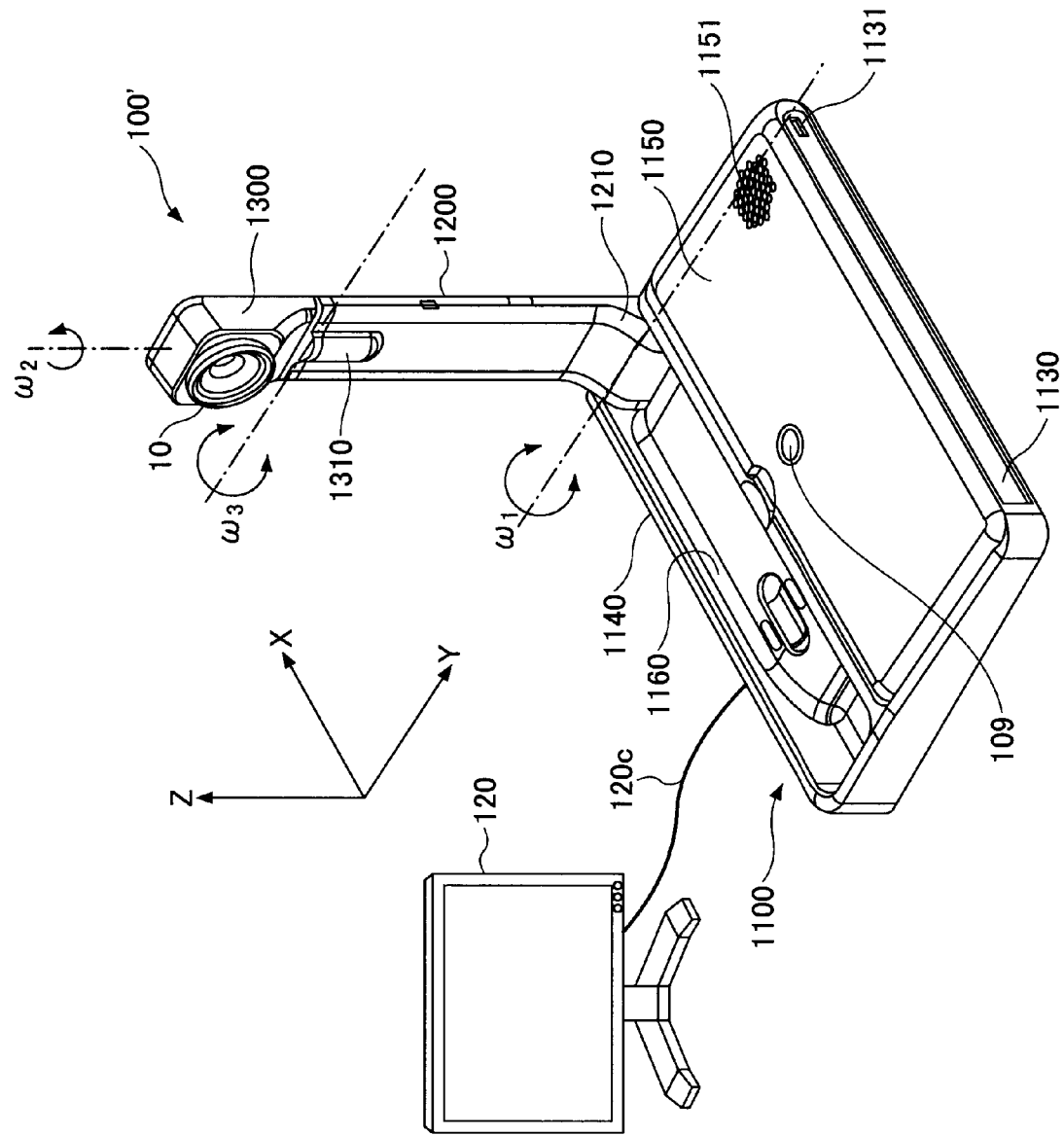
FIG. 15 illustrates a concrete example of the image processing apparatus according to the variation.

FIG. 15 is a perspective view of an example of the image processing apparatus 100' of FIG. 14. In the following, the longitudinal direction of the image processing apparatus 100' is defined as an X-axis direction, and a direction perpendicular to the X-axis direction in a horizontal plane is defined as a Y-axis direction (width direction). A direction perpendicular to the X-axis direction and the Y-axis direction is defined as a Z-axis direction (vertical direction or height direction).

The image processing apparatus 100' includes a casing 1100, an arm 1200, and a camera housing 1300. The casing 1100 includes a right-side wall surface 1130 in which a sound-collecting opening 1131 is formed. External sound that has passed through the sound-collecting opening 1131 is collected by the sound input unit 14 provided within the casing 1100.

The casing 1100 also includes an upper-surface unit 1150 having a power switch 109 and a sound-output opening 1151. A user may turn on the power switch 109 to start up the image processing apparatus 100'. The sound produced by the sound output unit 12 may pass through the sound-output opening 1151 to the outside of the casing 1100.

The casing 1100 also includes a left-side wall surface 1140 in which a container unit 1160 is formed in a concave shape for accommodating the arm 1200 and the camera housing 1300. The left-side wall surface 1140 may also include a connection opening (not illustrated) for allowing connection of the image output unit 30 to the display apparatus 120 via the cable 120c.

The arm 1200 is attached to the casing 1100 via a torque hinge 1210 such that the arm 1200 can be rotated up and down with respect to the casing 1100 in a range of tilt angle $\omega_1$ of 135°, for example. In the illustrated example of FIG. 15, the tilt angle $\omega_1$ is 90°. When the tilt angle $\omega_1$ is 0°, the arm 1200 and the camera housing 1300 may be housed within the container unit 1160.

The camera housing 1300 contains the built-in photography unit 10. The photography unit 10 may photograph a person (such as a teleconference participant), letters or symbols on a sheet of paper, or the room in which the conference is taking place. The camera housing 1300 is attached to the arm 1200 via a torque hinge 1310. The torque hinge 1310 may be configured to allow the camera housing 1300 to be rotated up and down or left and right with respect to the arm 1200 in a range of pan angle $\omega_2$ of ±180° and a range of tilt angle $\omega_3$ of ±45 from the position illustrated in FIG. 15 where both of the angles are zero.

The image processing apparatus 100 may have structures other than that illustrated in FIG. 15. For example, the image processing apparatus 100 may include a PC (Personal Computer) to which the sound output unit 12 or the sound input unit 14 is externally connected. Preferably, the image processing apparatus 100 may be applied to a portable terminal such as a smartphone.

Figure 2:
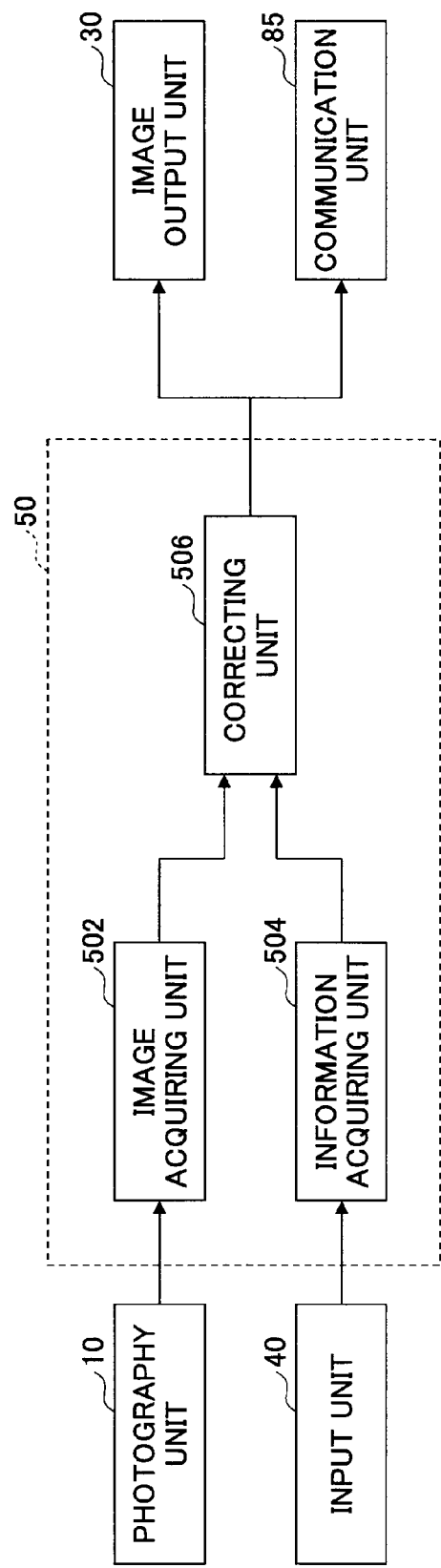
FIG. 2 is a functional block diagram of a CPU of the image processing apparatus.
Figure 3:
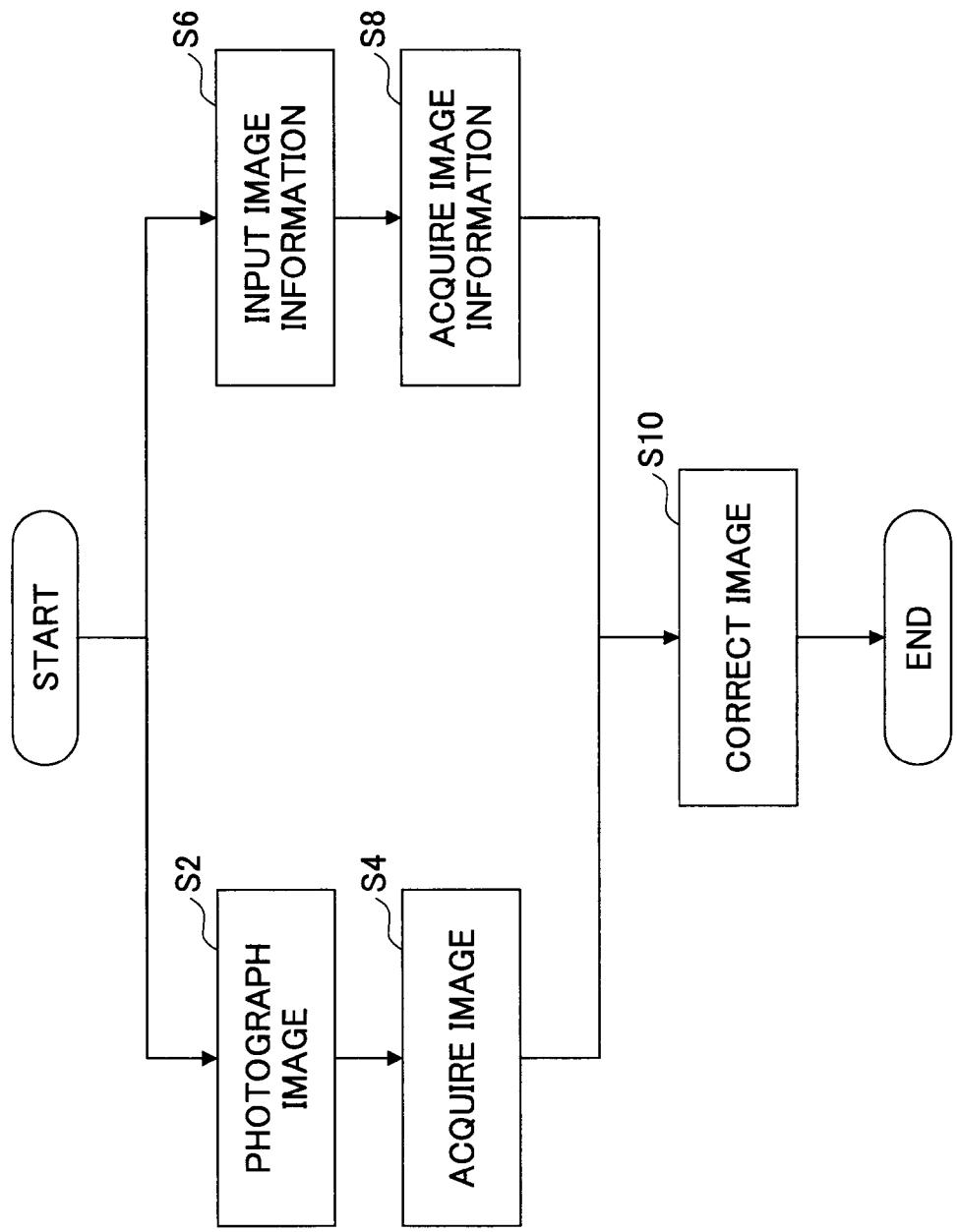
FIG. 3 is a flowchart of an operation of the image processing apparatus.
Figure 4:
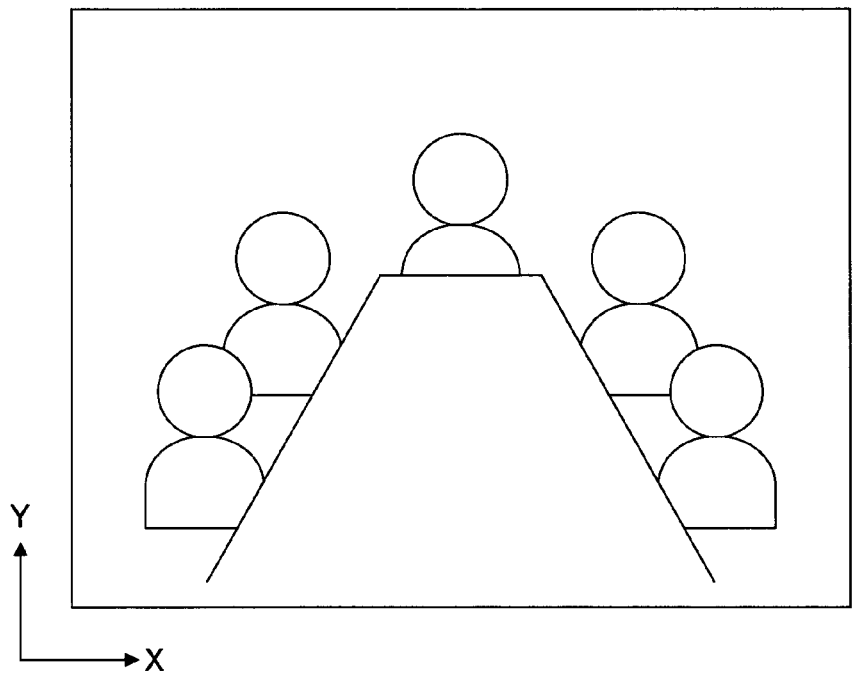
FIG. 4 illustrates an example of a process target.
Figure 5:
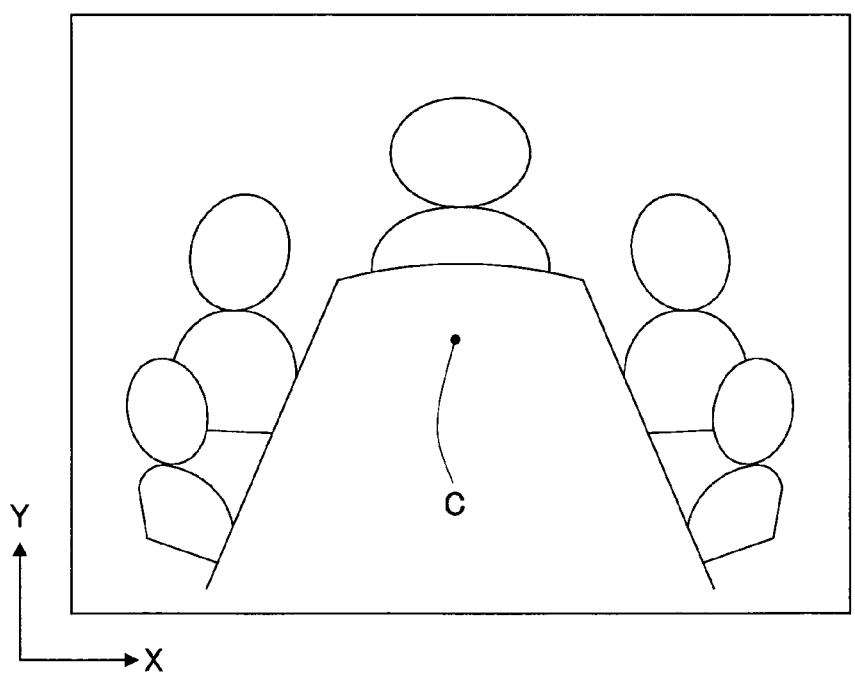
FIG. 5 illustrates an example of an image photographed with a wide angle lens.

FIG. 2 is a functional block diagram of the CPU 50 of Embodiment 1. FIG. 3 is a flowchart of an operation of the image processing apparatus of Embodiment 1. First, the photography unit 10 photographs a process target (subject) (step S2). In the present example, the process target is a conference as illustrated in FIG. 4. In the example of FIG. 4, five people are sitting at a table and taking part in the conference. FIG. 5 illustrates an example of the image taken of the conference of FIG. 4 when the photography unit 10 is a camera unit with a wide angle lens. As illustrated in FIG. 5, the image has a barrel-shaped distortion. The "distortion" herein refers to a geometric warping, and is a cause of warping. Generally, distortion hardly occurs near the center of optical axis C (image center). The distortion tends to increase with increasing distance from the center of optical axis C. Particularly, in the case of barrel-shaped warping, the image may be warped such that it appears compressed toward the center of optical axis. A "vertical direction" herein refers to the vertical direction (gravitational direction) of the subject and corresponds to a Y-axis direction. A "horizontal direction" refers to the direction perpendicular to the vertical direction in the plane of the image and corresponds to an X-axis direction (see FIG. 4).

An optical image that has passed through an optical lens is converted into an electric signal (image data) by an imaging element in the photography unit 10. The imaging element may include a CCD or a CMOS sensor. When the imaging element has a Bayer arrangement (by which one of the color components of R, G, or B is allocated to each pixel of pixel data), further Bayer conversion may be performed to generate an image in which the R, G, and B color components are allocated to each pixel.

The photographic image of the process target is input to an image acquiring unit 502. The image acquiring unit 502 acquires the input image of the process target (subject) (step S4). The aforementioned Bayer conversion may be performed by the image acquiring unit 502. The image acquiring unit 502 may generate a RGB image, a UV image, or a YCbCr image.

Image information is input via the input unit 40 (step S6). The image information may include information about the contents of the image recorded by the photography unit 10 (such as the photographed scene). The image information may include information indicating that the image is of a scene of a person ("person information") or information indicating that the image includes letters or symbols on a white board or a sheet ("letter information"). Preferably, the image information may include information indicating other contents. In the following, the case where the image information corresponds to person information is referred to as "a person mode" and the case where the image information corresponds to letter information is referred to as "a letter mode". The image information (mode) may be set in advance and stored in the storage unit 60.

The input unit 40 may include a touch panel function configured to display plural items of image information (photography modes, i.e., the person mode and the letter mode in the illustrated example), to the user so that the user can select one of the information items. When the user selects the person mode, person information may be input via the input unit 40 as image information. When the user selects the letter mode, letter information may be input via the input unit 40 as image information. Thus, the user inputs image information via the input unit 40. When the image processing apparatus 100 is used for a video teleconference, the user may select the person mode via the input unit 40. The image information input via the input unit 40 is sent to an information acquiring unit 504. The information acquiring unit 504 thus acquires the image information (step S8).

The image acquired by the image acquiring unit 502 and the image information acquired by the information acquiring unit 504 are input to a correcting unit 506. The correcting unit 506 may correct the image based on the image information such that some of the warping of the image is left (remains). More specifically, the correcting unit 506 may correct the image based on the image information such that some of the image distortion is left. "Some" of the image warping refers to a predetermined proportion (or amount) of warping in a predetermined direction of the image, such as the vertical direction, the horizontal direction, or a direction in which a predetermined proportion of a vertical direction vector and a predetermined proportion of a horizontal direction vector are added (i.e., an inclined direction). "Based on the image information" refers to determining whether the image information corresponds to person information or letter information.

<When Image Information Indicates Person Image>

The case where the image information indicates that the contents of an image correspond to an image of person is described. Namely, this is the case where the user selects the person mode via the input unit 40 (where the image information corresponds to person information). In this case, the vertical direction of the image corresponds to the depth direction of the scene of the conference in the plane of the image. The horizontal direction of the image corresponds to the direction perpendicular to the vertical direction in the plane of the image.

Generally, it is not preferable from the user's point of view if the face or body of a person in the image appear bent by warping. Thus, the correcting unit 506 corrects the image such that the horizontal direction component of warping (X-axis direction component in FIG. 4) can be entirely eliminated. With regard to the vertical direction (depth direction) component of warping (Y-axis direction component in FIG. 4), the correcting unit 506 corrects the image such that a predetermined proportion (amount) of warping is left. In this way, distortion can be eliminated while controlling the enhancement of perspective in the person image.

Figure 6:
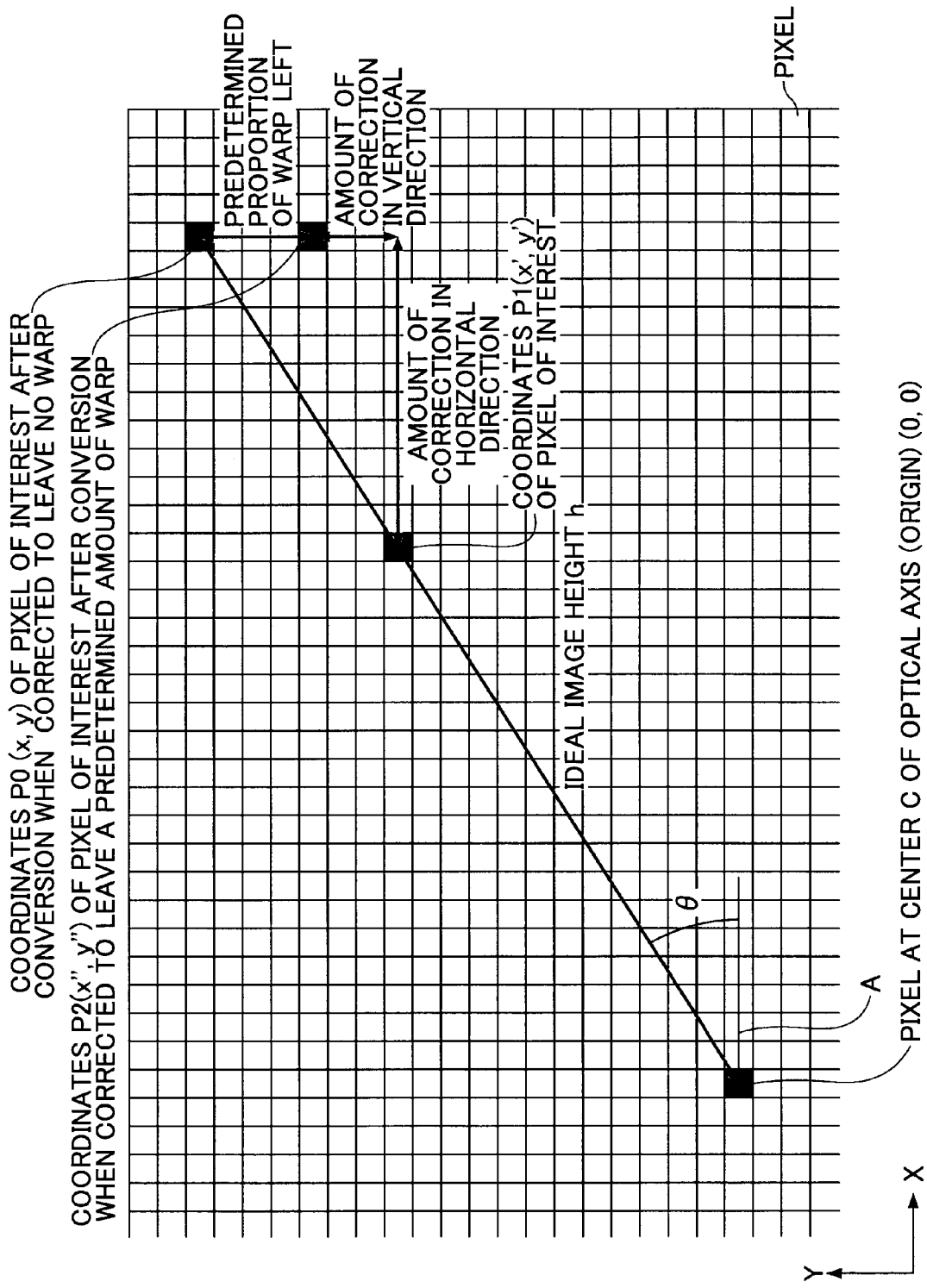
FIG. 6 illustrates a pixel of interest.

FIG. 6 illustrates the relationship between a pixel of an image before conversion and a pixel of the image after conversion. With reference to FIG. 6, a process by the correcting unit 506 is described. First, terms are described. Each section of the grid of FIG. 6 corresponds to a pixel. The center C of optical axis (see also FIG. 5) corresponds to the origin (where the coordinates are (0, 0)). A "pixel of interest" refers to one of the entire pixels of the image (actual image) before correction that is under consideration. The coordinates of the pixel of interest are expressed by P1(x', y'). When the image is corrected such that a predetermined amount of warping is left (i.e., when the image information corresponds to person information), the coordinates of the pixel of interest after conversion are expressed by P2(x", y"). When the image is corrected such that no image warping is left (as will be described later), the coordinates of the pixel of interest after conversion are expressed by P0(x, y).

Figure 7A:
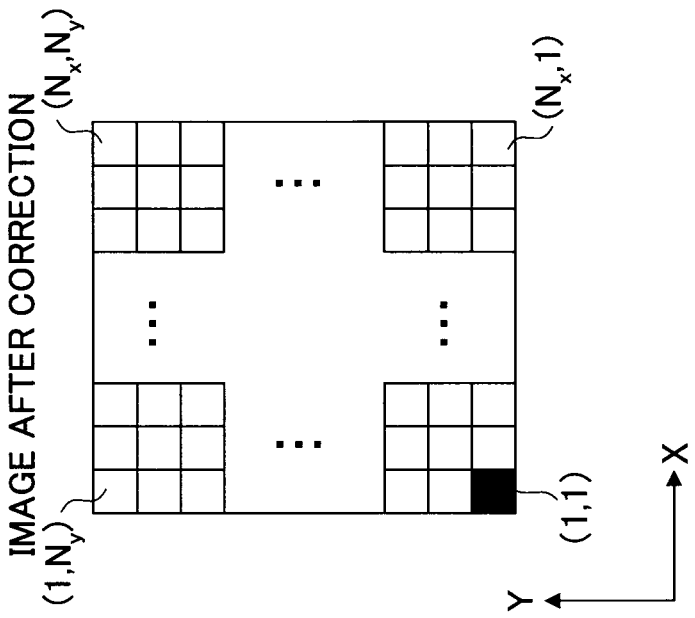
FIG. 7A illustrates an image before correction.
Figure 7B:
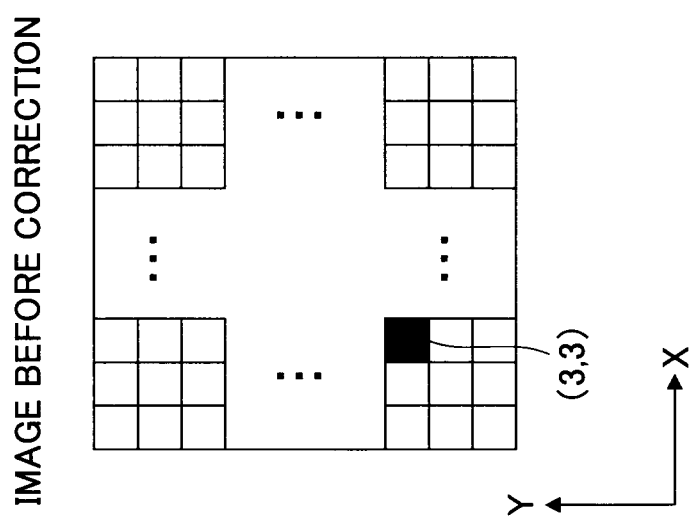
FIG. 7B illustrates an image after correction.

When the image is corrected by the correcting unit 506, P1(x', y') is converted to P2(x", y"). FIGS. 7A and 7B schematically illustrate pixels of an image before correction (FIG. 7A), which may be hereafter referred to as "pre-conversion pixels", and pixels of the image after correction (FIG. 7B), which may be hereafter referred to as "post-conversion pixels. In the illustrated example, the correcting process performed by the correcting unit 506 includes a process for determining a correspondence relationship ("a first process") and a process for determining and setting a luminance value ("a second process). With reference to FIGS. 7A and 7B, the process of the correcting unit 506 is described.

<Process for Determining Correspondence Relationship (First Process)>

First, the correcting unit 506 determines a pre-conversion pixel corresponding to a post-conversion pixel in the first process. In the example of FIGS. 7A and 7B, the number of post-conversion pixels in the X-axis direction is $N_x$ and the number of the post-conversion pixels in the Y-axis direction is $N_y$. Thus, there are $N_x \times N_y$ post-conversion pixels.

In the example of FIGS. 7A and 7B, the post-conversion pixel (1, 1) of interest in FIG. 7B corresponds to the pre-conversion pixel (3, 3) in FIG. 7A. The method for determining the pre-conversion pixel corresponding to the post-conversion pixel will be described later. The post-conversion pixel of interest is changed to (2, 1), (3, 1), . . . , ($N_x$, 1), (1, 2), (1, 3), . . . , (1, $N_y$), . . . , and ($N_x$, $N_y$) in order to determine the coordinates of the pre-conversion pixels corresponding to all of the post-conversion pixels.

Between the pre-conversion pixel P1(x', y') and the post-conversion pixel P2(x", y"), the following expressions (1) hold. A pre-conversion pixel of coordinates (a, b) is expressed as the pre-conversion pixel (a, b), while a post-conversion pixel of coordinates (c, d) is expressed as the post-conversion pixel (c, d).

$$x' = x'' + \alpha \sum_{m=1}^{M} c_m h^m \times \cos\theta \qquad (1)$$

$$y' = y'' + \beta \sum_{m=1}^{M} c_m h^m \times \sin\theta$$

where h is an ideal image height, i.e., the distance between the center of optical axis C(0, 0) and P0(x, y), where $h=(x^2+y^2)^{1/2}$. The value of h for each pixel of interest may be measured in advance by calibration. A conversion coefficient $c_m$ may be determined in advance based on (x, y)(x', y'). A constant M may be determined in advance in accordance with the type of the camera unit of the photography unit 10. Correction ratios $\alpha$ and $\beta$ determine the degree of reduction of distortion, where $0 \le \alpha \le 1$, $0 \le \beta \le 1$. The correction ratios $\alpha$ and $\beta$ may be determined in accordance with image information. The greater the value of $\alpha$ or $\beta$, the more is the amount of reduction of distortion. The less the value of $\alpha$ or $\beta$, the less is the amount of reduction of distortion.

When the image information corresponds to person information, the image is corrected such that the horizontal direction component (X-axis direction component) of warping can be completely or nearly completely eliminated. When the image is corrected such that the horizontal component of warping can be completely eliminated, $\alpha$ is set to 1. When the image is corrected such that the horizontal component warping is nearly completely eliminated, $\alpha$ is set to a value close to 1, such as 0.9. When the image information corresponds to person information, the image may be corrected such that a predetermined proportion of warping in the vertical direction component (Y-axis direction) can be left by setting $\beta=0.3$, for example.

Thus, when the image information corresponds to person information, the correcting unit 506 may preferably correct the image such that the horizontal direction component of warping is eliminated more than the vertical direction component of warping. In other words, $\alpha$ may be preferably set to 1 or a value close to (such as 0.9) where $\alpha > \beta$.

In the expressions (1), $\theta$ is an angle formed by a horizontal line A and a line through the pixel of interest P1(x', y'). The value of $\theta$ is measured each time the post-conversion pixel of interest is changed. Due to the characteristics of distortion, the origin (0, 0), P1(x', y'), and P0(x, y) are located on a straight line (of the ideal image height h, with arrows).

From the expressions (1), the coordinates P1(x', y') before conversion corresponding to the coordinates P2(x", y") after conversion can be determined. In this way, the coordinates of the pre-conversion pixels corresponding to all of the $N_x \times N_y$ post-conversion pixels are determined. The values of $c_m$ and M of the expressions (1) may be stored in the storage unit 60 in advance.

<Process for Determining and Setting Luminance Value (Second Process)>

Thereafter, the correcting unit 506 determines the luminance values of all of the pre-conversion pixels P1(x', y') calculated by the expressions (1) in the second process. The luminance values may be determined by a method well-known in the art. The correcting unit 506 sets the determined luminance values of the pre-conversion pixels as the luminance values of the corresponding post-conversion pixels.

For example, when the post-conversion pixel of interest is (1, 1), the pre-conversion pixel (3, 3) corresponding to the post-conversion pixel of interest (1, 1) is determined (first process) according to the expressions (1), and then the luminance value of the pre-conversion pixel (3, 3) is determined (second process). The determined luminance value of the pre-conversion pixel (3, 3) is set for the post-conversion pixel (1, 1). Similarly, the first process and the second process are performed for all the other post-conversion pixels. In this way, the correcting unit 506 generates a corrected image.

Preferably, the correcting unit 506 may first determine the pre-conversion pixels corresponding to all of the post-conversion pixels, and then determine the luminance values of all of the pre-conversion pixels. Preferably, the correcting unit 506 may determine one pre-conversion pixel corresponding to a post-conversion pixel and then determine the luminance value of the determined pre-conversion pixel. Further preferably, the correcting unit 506 may determine a predetermined number of pre-conversion pixels corresponding to the post-conversion pixels and then determine the luminance values of all of the predetermined number of the determined pre-conversion pixels, and repeat the above process until the luminance values of all of the pre-conversion pixels are determined.

Figures 8, 9:
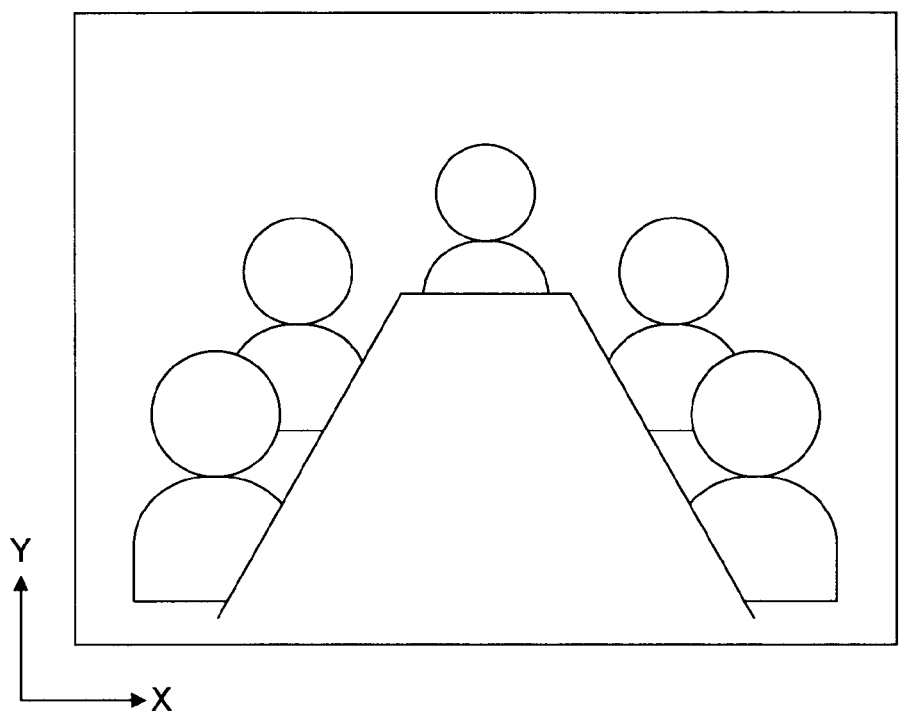
FIG. 8 illustrates an example of the corrected image.
FIG. 9 illustrates the correlation between image information and correction ratios.

The corrected image may be input to the image output unit 30 or the communication unit 85. The image output unit 30 may output the corrected image to the display apparatus 120 (see FIG. 1 or 14) via the cable 120*c*. The communication unit 85 may transmit the corrected image to another image processing apparatus connected via the network 1000 (see FIG. 13). FIG. 8 illustrates an example of the corrected image generated from an acquired image of FIG. 5, thus obtaining an image substantially identical to the image of FIG. 4. The corrected image may be displayed by the display apparatus 120 or transmitted to the other image processing apparatus.

<When Image Information Indicates an Image of Letters Written on a White Board or a Sheet>

Next, the case where the user selects the letter mode is described. When the letter mode is selected, i.e., when the image is of letters or figures written or drawn on a white board or a sheet of paper, for example, warping of the letters and the like due to distortion makes the image difficult to see and should be avoided from the user's point of view. Thus, the correcting unit 506 corrects the image such that both the horizontal direction component and the vertical direction component of distortion can be completely or nearly completely eliminated. When both the horizontal direction component and the vertical direction component of distortion are completely eliminated, the pre-conversion coordinates P1(x', y') corresponding to the post-conversion coordinates P2(x", y") may be determined by setting the correction ratios of the expressions (1) such that $\alpha=\beta=1$ (first process). When the horizontal direction component and the vertical direction component of distortion are nearly completely eliminated, the pre-conversion coordinates P1(x', y') corresponding to the post-conversion coordinates P2(x", y") may be determined by setting at least one of the correction ratios $\alpha$ and to a value close to 1 (such as 0.9) in the expressions (1) (first process).

Then, the luminance values of all of the pre-conversion pixels P1(x', y') are determined and set for the corresponding post-conversion pixels (second process). When the image is corrected such that both the horizontal direction component and the vertical direction component of distortion can be entirely eliminated, P1(x', y') is converted to P0(x, y) in FIG. 6. Other processes may be similar to those in the case of the person mode, and therefore their description is omitted.

The values of $\alpha$ and $\beta$ may be determined for each type of image information and stored in a table in the storage unit 60 in advance. FIG. 9 illustrates an example of the table. In the example of FIG. 9, in the case of the person information as the image information, $\alpha=1$ and $\beta=0.3$, while in the case of the letter information as the image information, $\alpha=\beta=1$. The correction ratios $\alpha$ and $\beta$ may be determined for a type of image information other than person information and letter information. The correcting unit 506 extracts the values of $\alpha$ and $\beta$ corresponding to the image information acquired by the information acquiring unit 504 and then performs correction by applying the values to the expressions (1).

Preferably, instead of setting the fixed values of the correction ratios on a scene by scene (image information) basis, a value input by the user may be used as a correction ratio. In this case, the user may input the correction ratios via the input unit in advance, and the values may be stored in the storage unit 60 in the form of the table as illustrated in FIG. 9.

In the prior art including Patent Document 1, when a photographic image having a barrel-shaped distortion is corrected, the image is often corrected by enlarging the image radially from the center of optical axis and then reducing the size of the corrected image, which is larger than the image before correction, back to the size of the image before correction. As a result, a subject near the center of optical axis (image center) in the image tends to become smaller after correction of distortion, thus enhancing the perspective of the image as a whole.

In the image processing apparatus according to Embodiment 1, the correcting unit 506 corrects the image based on the image information acquired by the information acquiring unit 502 such that some of the warping of the image remains. The image processing apparatus according to the present embodiment corrects the input image by using the expressions (1) and the values of $\alpha$ and $\beta$ illustrated in FIG. 9.

Further, the image processing apparatus according to Embodiment 1 is capable of adjusting the degree of reduction of distortion depending on the photographed object (such as a person or letters/symbols). Thus, the image processing apparatus can generate an image in which distortion is reduced while enhancement of perspective is prevented as much as possible, thus achieving an appropriate balance between distortion and perspective. Specifically, when the photographic image is of a person, the image is corrected such that a predetermined amount of the horizontal direction component of warping remains while the vertical direction component of warping is entirely or nearly entirely eliminated. By thus correcting the image, an image (person image) in which distortion and perspective are balanced can be obtained.

In the foregoing example, the image corrected by the image processing apparatus 100 is transmitted to the other image processing apparatus by the communication unit 85 via the network. In another example, an un-corrected image transmitted from any of the other image processing apparatuses $100_2$ through $100_N$ may be corrected by the correcting unit 506 and displayed by the display apparatus 120 via the image output unit 30 of the (local) image processing apparatus $100_1$. In this case, only the local image processing apparatus $100_1$ may include the CPU 50 and the other image processing apparatuses $100_2$ through $100_N$ may not need to include the CPU 50.

Embodiment 2

In the following, an image processing apparatus 200 according to Embodiment 2 is described. In Embodiment 1, the image processing apparatus 100 or 100' acquires the image information input by the user via the input unit 40. In accordance with Embodiment 2, the image processing apparatus 200 acquires the image information by analyzing the photographic image.

Figure 10:
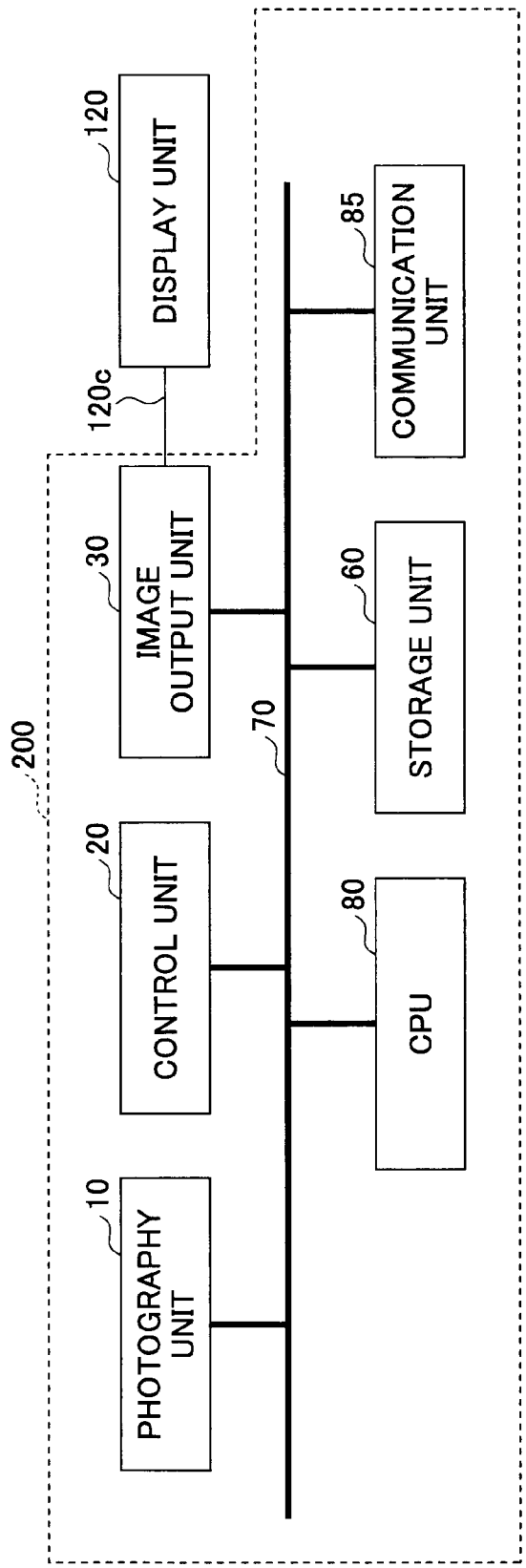
FIG. 10 is a functional block diagram of an image processing apparatus according to a second embodiment.

FIG. 10 is a functional block diagram of the image processing apparatus 200. FIG. 10 differs from FIG. 1 in that the input unit 40 is omitted and the CPU 50 is replaced with a CPU 80. The image processing apparatus 200 may also include a sound output unit 12 and a sound input unit 14 (see FIG. 14).

Figure 11:
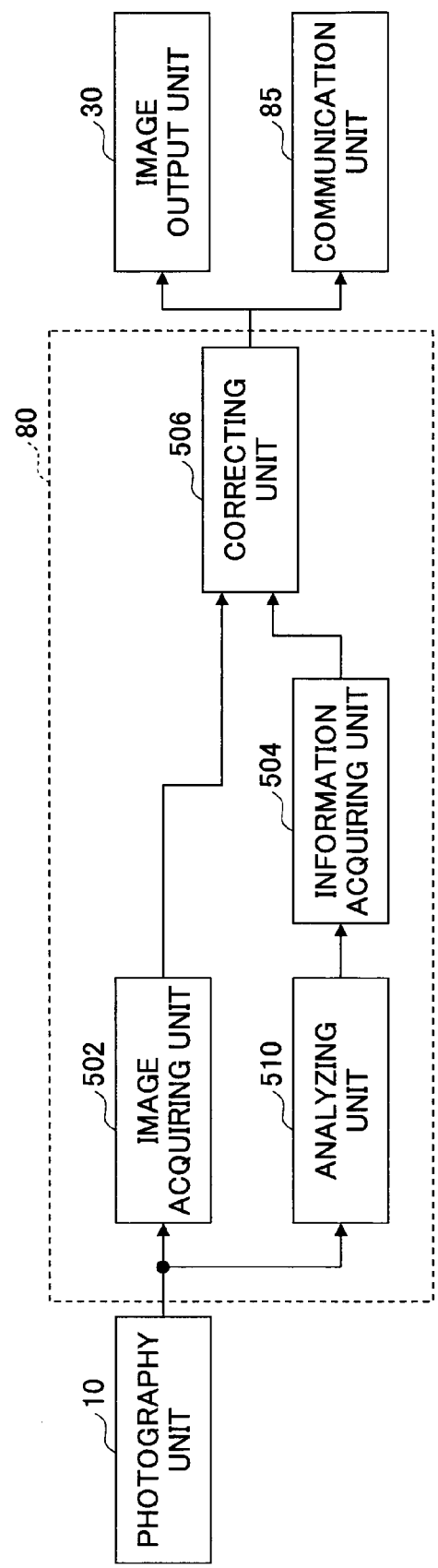
FIG. 11 is a functional block diagram of a CPU of the image processing apparatus according to the second embodiment.
Figure 12:
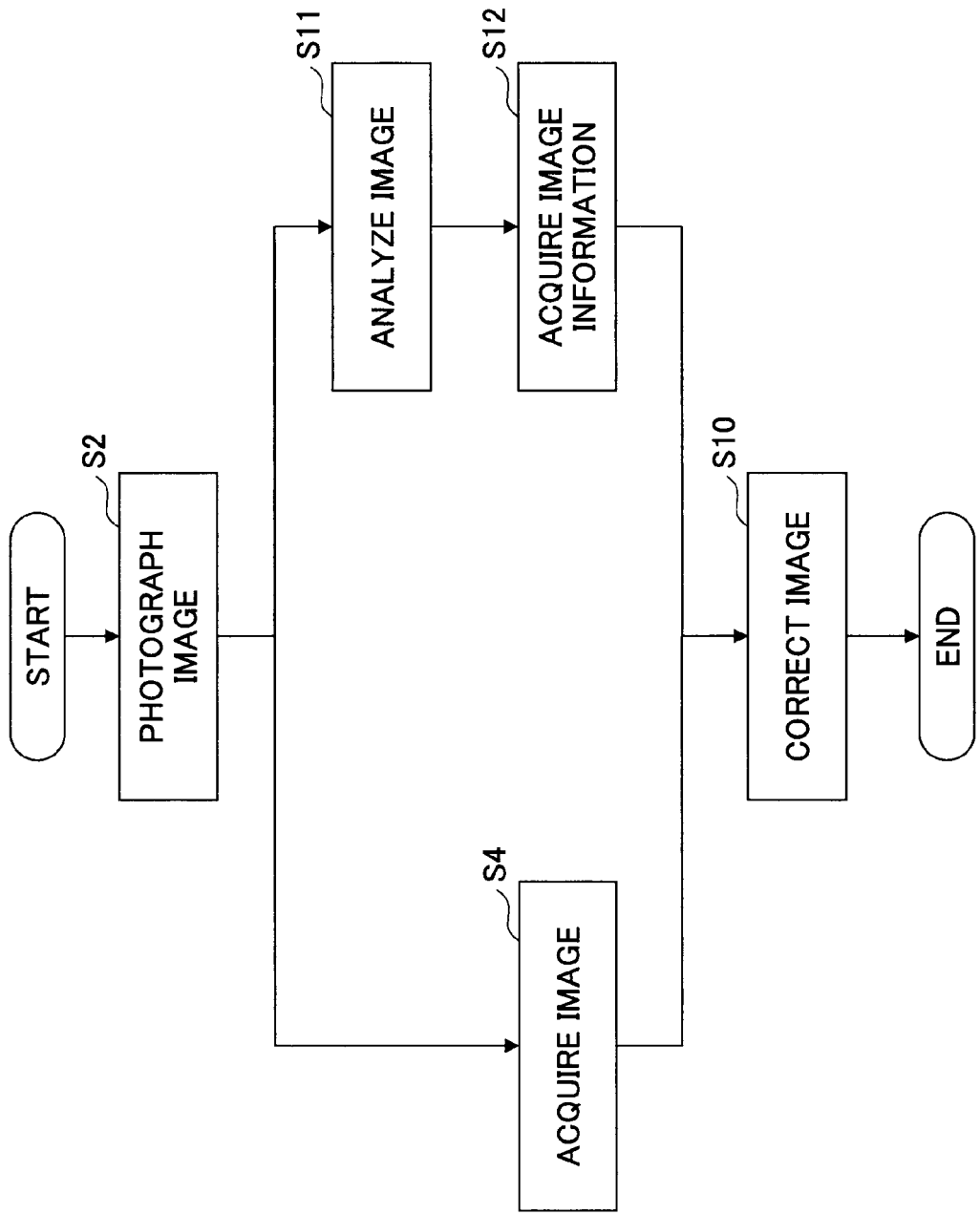
FIG. 12 is a flowchart of an operation of the image processing apparatus according to another embodiment.

FIG. 11 is a functional block diagram of the CPU 80. The CPU 80 includes an image acquiring unit 502, an analyzing unit 510, an information acquiring unit 504, and a correcting unit 506. FIG. 12 is a flowchart of an operation of the image processing apparatus 200. The photography unit 10 records a photographic image (step S2), and the photographed image is input to the image acquiring unit 502 and the analyzing unit 510.

The analyzing unit 510 analyzes the contents of the input image and generates image information based on the result of analysis (step S11). The information acquiring unit 504 acquires the image information generated by the analyzing unit 510 (step S12). The following description concerns a case where the image contents include two types; namely, an image of a person ("person information"), and an image of letters and the like written on a white board or a sheet of paper, for example ("letter information"). Thus, the image information corresponds to person information or letter information. Preferably, these two types of image information may be stored in the storage unit 60.

<First Analyzing Method>

Figure 16:
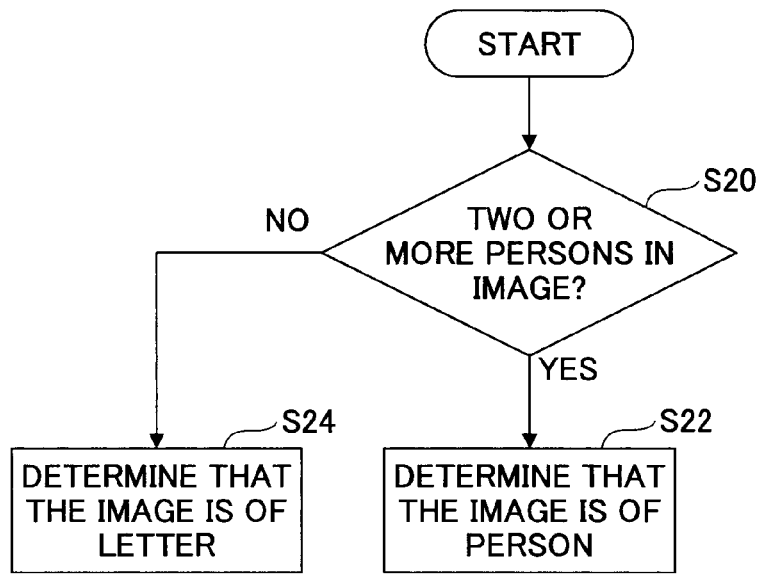
FIG. 16 is a flowchart of an operation of an analyzing unit.

A first analyzing method performed in step S11 by the analyzing unit 510 is described with reference to a flowchart of FIG. 16. First, the analyzing unit 510 determines whether an input image contains two or more persons (step S20) using a face detection technology. The face detection technology is not particularly limited and may include a method by which a pattern of a part, such as the eye, is detected, or a method involving the detection of a color pattern such as a skin color pattern.

When the analyzing unit 510 determines that there are two or more persons in the input image ("Yes" in step S20), the analyzing unit 510 determines that the input image is an image of person (step S22). Thus, the analyzing unit 510 generates person information as image information and outputs the person information to the information acquiring unit 504. Then, the information acquiring unit 504 acquires the person information as image information. Based on the acquired person information, the correcting unit 506 corrects the image by eliminating all or nearly all of the horizontal direction component of warping while leaving a predetermined proportion of the vertical direction component of warping (step S10 of FIG. 12).

On the other hand, when the analyzing unit 510 determines that there is one or no person in the input image ("No" in step S20), the analyzing unit 510 determines that the input image is an image of letters (step S22). Thus, the analyzing unit 510 generates letter information as image information and outputs the letter information to the information acquiring unit 504. The information acquiring unit 504 acquires the letter information as image information. Based on the acquired letter information, the correcting unit 506 corrects the image such that the horizontal direction component and the vertical direction component of warping are entirely or nearly entirely eliminated (step S10 of FIG. 12).

The case where the input image contains one person is described. In this case, as mentioned above, the analyzing unit 510 generates letter information as image information, and the correcting unit 506 corrects the image such that all or nearly all of the horizontal direction component and the vertical direction component of distortion are eliminated.

The case where the input image contains one person may include a case (i) where the one person is talking while drawing a letter or a figure on a white board or a sheet; and a case (ii) where the one person is making an oral presentation or explanation without drawing letters or figures.

In the case (i), it may be more often the case than not that the letter or figure drawn on the white board or sheet is more important to the teleconference participants than the image of the person. Thus, in order to avoid the difficulty of seeing the letter or figure due to distortion, the correcting unit 506 corrects the image such that all or nearly all of the horizontal direction component and the vertical direction component of warping are eliminated.

In the case (ii), it may be more often the case than not that the one person giving the oral presentation is located at the center of the image (point C in FIG. 5). Generally, the warping of a subject located at the center of image is very small. Thus, the correcting unit 506 corrects the image such that all or nearly all of the horizontal direction component and the vertical direction component of distortion can be eliminated.

Thus, in the cases (i) and (ii) where the input image contains one person, the correcting unit 506 corrects the image such that the horizontal direction component and the vertical direction component of warping can be entirely or nearly entirely eliminated.

<Second Analyzing Method>

Figure 17:
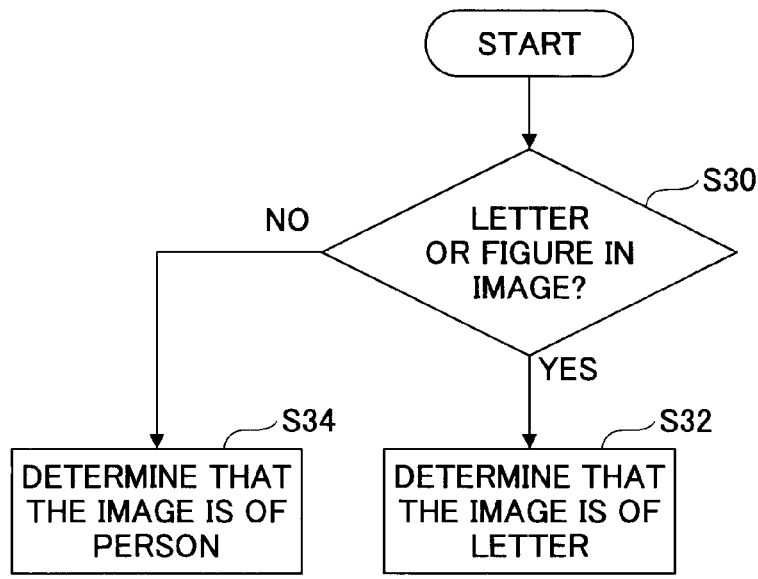
FIG. 17 is a flowchart of another operation of the analyzing unit.

Next, a second analyzing method performed by the analyzing unit 510 in step S11 is described with reference to a flowchart of FIG. 17. First, the analyzing unit 510 determines whether the input image contains letters or symbols (step S30) by a method described below. Generally, when the image is of a letter written on a white board and the like, the ratio of white to color in the image is large. Thus, the analyzing unit 510 determines the white ratio. When the white ratio is larger than a predetermined threshold value, the analyzing unit 510 determines that the image is an image of letters written on a white board and the like.

The medium on which letters and the like are written or drawn is not limited to the whiteboard and may include a white sheet of various materials, such as paper. The color of the medium is not limited to white. Preferably, the luminance of the letters is greatly different from that of the color of the medium in order to facilitate analysis by the analyzing unit 510. For example, when the medium on which the letter is written is a blackboard whose color is closer to black, the color of the letter is preferably white, such as that of chalk.

Figure 18:
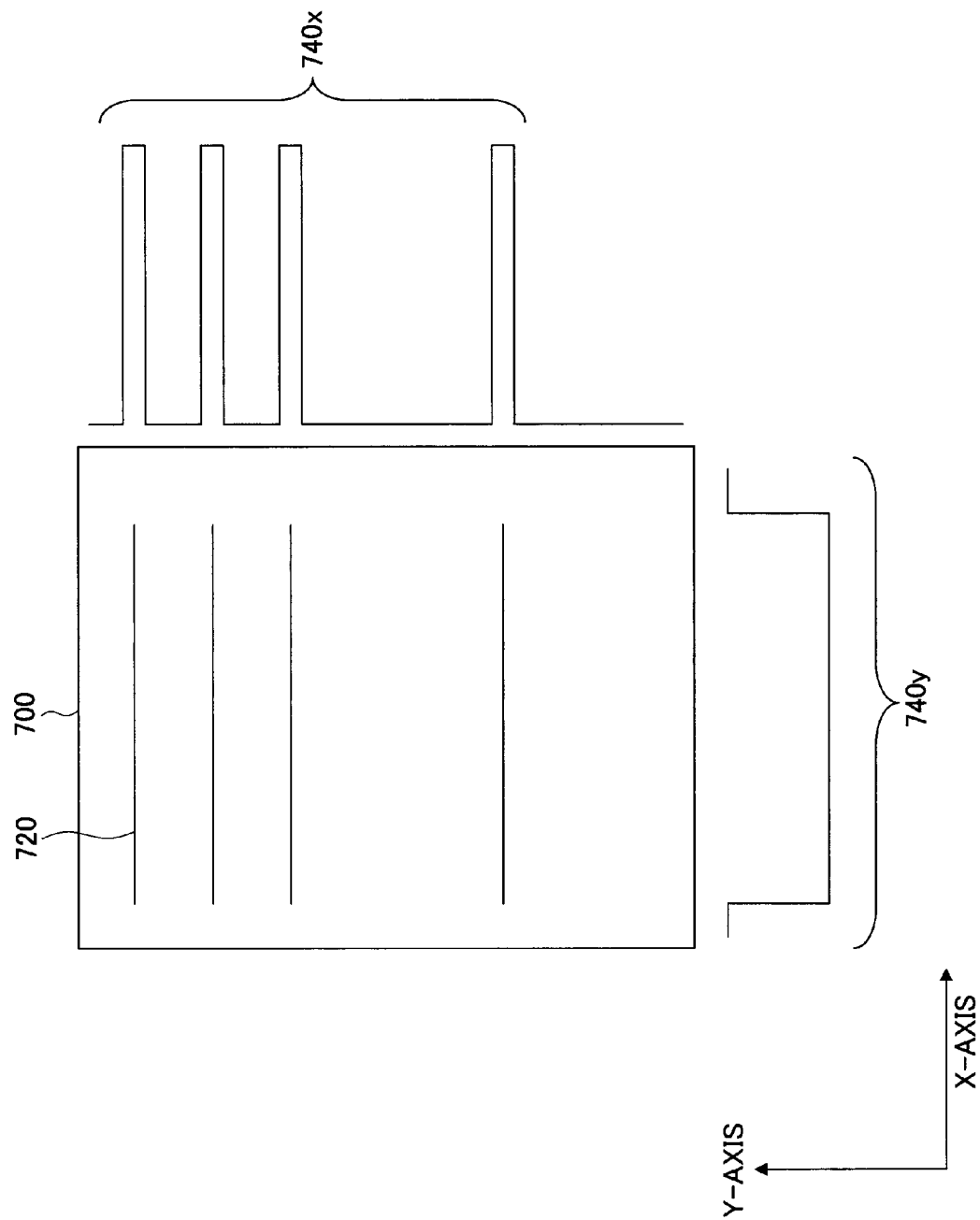
FIG. 18 illustrates an analysis process for analyzing letters and the like performed by the analyzing unit.

Another method by which the analyzing unit 510 may determine whether the image contains letters or symbols is described with reference to FIG. 18. FIG. 18 illustrates an example in which four lines of black letters 720 are written on a white sheet 700. In this case, the analyzing unit 510 determines a total value of black pixels of a unit line along an X-axis and a Y-axis. The "unit line" refers to a line having a width of one pixel and extending in the X-axis direction or the Y-axis direction. In the example of FIG. 18, the analyzing unit 510 determines a total value $740x$ of black pixels of the unit line in the X-axis direction and a total value $740y$ of black pixels of the unit line in the Y-axis direction. By thus determining the total values $740x$ and $740y$, the analyzing unit 510 may determine that the image shows a horizontal line of letters. By a similar method, the analyzing unit 510 may determine that the image shows a vertical line of letters.

When the analyzing unit 510 determines that the image contains letters or figures ("Yes" in step S30), the analyzing unit 510 determines that the input image is of letters or figures (step S32). Thus, the analyzing unit 510 generates letter information as image information and outputs the letter information to the information acquiring unit 504. The information acquiring unit 504 acquires the letter information as image information. Based on the acquired letter information, the correcting unit 506 corrects the image such that the horizontal direction component and the vertical direction component of warping can be completely or nearly completely eliminated (step S10 in FIG. 12).

When the analyzing unit 510 determines that the image does not contain letters or figures ("No" in step S30), the analyzing unit 510 may determine that the input image contains two or more persons (step S34). In this case, the analyzing unit 510 generates person information as image information and outputs the person information to the information acquiring unit 504. The information acquiring unit 504 acquires the person information as image information. Based on the acquired person information, the correcting unit 506 corrects the image such that the horizontal direction component of warping can be completely or nearly completely eliminated, while leaving a predetermined proportion of the vertical direction component of warping (step S10).

Preferably, the analyzing unit 510, based on the result of determination, may generate the image information by selecting the image information from plural items of image information stored in the storage unit 60 (i.e., the person information and the letter information in the present example). Thus, by setting and storing the image information in the storage unit 60 in advance, the analyzing unit 510 can generate accurate image information. Alternatively, the analyzing unit 510 may generate the image information based on the result of determination without using the plural items of image information stored in the storage unit 60. In this case, cost of storing in the storage unit 60 can be reduced. The image information generated by the analyzing unit 510 is input to the correcting unit 506.

Referring to FIGS. 11 and 12, the image recorded by the photography unit 10 (step S2) is input to the image acquiring unit 502. The image acquiring unit 502 acquires the input image (step S4). The image acquired by the image acquiring unit 502 is input to the correcting unit 506. Based on the input image information, the correcting unit 506 corrects the input image (step S10). The method of correction by the correcting unit 506 may be similar to that described above with reference to Embodiment 1.

Thus, in the image processing apparatus 200 according to Embodiment 2, the analyzing unit 510 acquires the image information by analyzing the photographic image. Thus, there is no need to provide the input unit 40 as in Embodiment 1, and also the process of selecting the image information by the user can be omitted.

The image processing apparatus according to the foregoing embodiments may be realized by causing a computer to decode an image processing program in an embodiment of the present invention. The image processing program may be written in a computer-readable program language and stored in a computer-readable recording medium, such as a magnetic disk or a CD-ROM. The image processing program may be installed in the computer from the recording medium or via a communications line. The installed image processing program may be decoded by a CPU in the computer so that the computer can provide the functions of the image processing apparatus.

Thus, in accordance with the image processing apparatus, the image processing method, or the computer-readable recording medium according to various embodiments, an image in which distortion and perspective are balanced can be generated.

Although this invention has been described in detail with reference to certain embodiments, variations and modifications exist within the scope and spirit of the invention as described and defined in the following claims.

The present application is based on Japanese Priority Applications No. 2010-174702 filed Aug. 3, 2010 and No. 2011-128398 filed Jun. 8, 2011, the entire contents of which are hereby incorporated by reference.

The invention claimed is:

1. An image processing apparatus comprising:
an image acquiring unit configured to acquire an image;
an information acquiring unit configured to acquire image information indicative of a content of the image; and
a correcting unit configured to correct the image based on the image information such that some of warping of the image is left,
wherein the correcting unit corrects the image such that a horizontal direction component of the warping is completely or nearly completely eliminated while a predetermined proportion of a vertical direction component of the warping is left when the image information indicates that the content of the image is a person.

2. The image processing apparatus according to claim 1, further comprising an input unit configured to receive the image information,
wherein the information acquiring unit acquires the image information via the input unit.

3. An image processing apparatus comprising:
an image acquiring unit configured to acquire an image;
an information acquiring unit configured to acquire image information indicative of a content of the image;
a correcting unit configured to correct the image based on the image information such that some of warping of the image is left; and
an analyzing unit configured to generate the image information by analyzing the image,
wherein the information acquiring unit acquires the image information generated by the analyzing unit, and
wherein the analyzing unit generates the image information indicating that the content of the image is a person when the analyzing unit determines that the image contains two or more persons.

4. The image processing apparatus according to claim 3, wherein the analyzing unit corrects the image such that a horizontal direction component and a vertical direction component of the warping are completely or nearly completely eliminated when the analyzing unit determines that the image contains one or no person.

5. The image processing apparatus according to claim 3, further comprising a storage unit configured to store plural items of the image information in advance,
wherein the analyzing unit generates the image information by selecting one of the plural items of the image information stored in the storage unit.

6. An image processing method comprising:
acquiring an image;
acquiring image information indicative of a content of the image; and
correcting the image based on the image information such that some of warping of the image is left,
wherein the correcting corrects the image such that a horizontal direction component of the warping is completely or nearly completely eliminated while a predetermined proportion of a vertical direction component of the warping is left when the image information indicates that the content of the image is a person.

7. A non-transitory computer-readable recording medium storing a program configured to cause a computer to perform the image processing method of claim 6.

8. An image processing method comprising:
acquiring an image;
acquiring image information indicative of a content of the image;
correcting the image based on the image information such that some of warping of the image is left; and
generating the image information by analyzing the image,
wherein the acquiring acquires the image information generated by the generating, and
wherein the generating generates the image information indicating that the content of the image is a person when the analyzing determines that the image contains two or more persons.

9. A non-transitory computer-readable recording medium storing a program configured to cause a computer to perform the image processing method of claim 8.

10. The image processing method according to claim 8, wherein the generating corrects the image such that a horizontal direction component and a vertical direction component of the warping are completely or nearly completely eliminated when the generating determines that the image contains one or no person.

11. A non-transitory computer-readable recording medium storing a program configured to cause a computer to perform the image processing method of claim 10.

* * * * *